United States Patent [19]

Lindre

[11] 4,456,098

[45] Jun. 26, 1984

[54] BRAKE PAD WITH ELECTRICAL CONTACTS FOR BRAKE WARNING SYSTEMS

[75] Inventor: Jaan Lindre, Benfleet, England

[73] Assignee: Ford Motor Company, Dearborn, Mich.

[21] Appl. No.: 485,374

[22] Filed: Apr. 18, 1983

Related U.S. Application Data

[63] Continuation of Ser. No. 204,665, Nov. 6, 1980, abandoned.

[30] Foreign Application Priority Data

Nov. 20, 1979 [GB] United Kingdom ............... 7940093

[51] Int. Cl.³ .............................................. F16D 66/02
[52] U.S. Cl. ............................... 188/1.11; 188/250 G; 340/52 A
[58] Field of Search ................... 188/1.11, 73.1, 71.1, 188/250 G, 250 B, 251 A, 251 R, 251 M, 261; 340/52 A, 52 B; 192/30 W; 200/61.4, 61.44, 61.41; 73/7, 9; 116/208

[56] References Cited

U.S. PATENT DOCUMENTS

| | | | |
|---|---|---|---|
| 1,902,759 | 3/1933 | Cataudella | 340/52 A |
| 3,649,959 | 3/1972 | Sakata et al. | 188/1.11 X |
| 3,689,880 | 9/1972 | McKee et al. | 340/52 A |
| 4,016,533 | 4/1977 | Ishikawa et al. | 188/1.11 X |
| 4,298,857 | 11/1981 | Robins et al. | 340/52 A |

FOREIGN PATENT DOCUMENTS 2036210 6/1980 United Kingdom ............... 188/1.11

Primary Examiner—Douglas C. Butler
Attorney, Agent, or Firm—Peter D. McDermott; Roger L. May

[57] ABSTRACT

A brake pad comprises a layer of friction material the working face of which engages a braking surface, and an electrical lead terminating in a contact positioned to engage the braking surface when the friction material is wearing thin, the electrical lead being composed of a flexible strip of insulating material carrying a flexible strip of conductive material, e.g. flexible printed circuit material.

10 Claims, 6 Drawing Figures

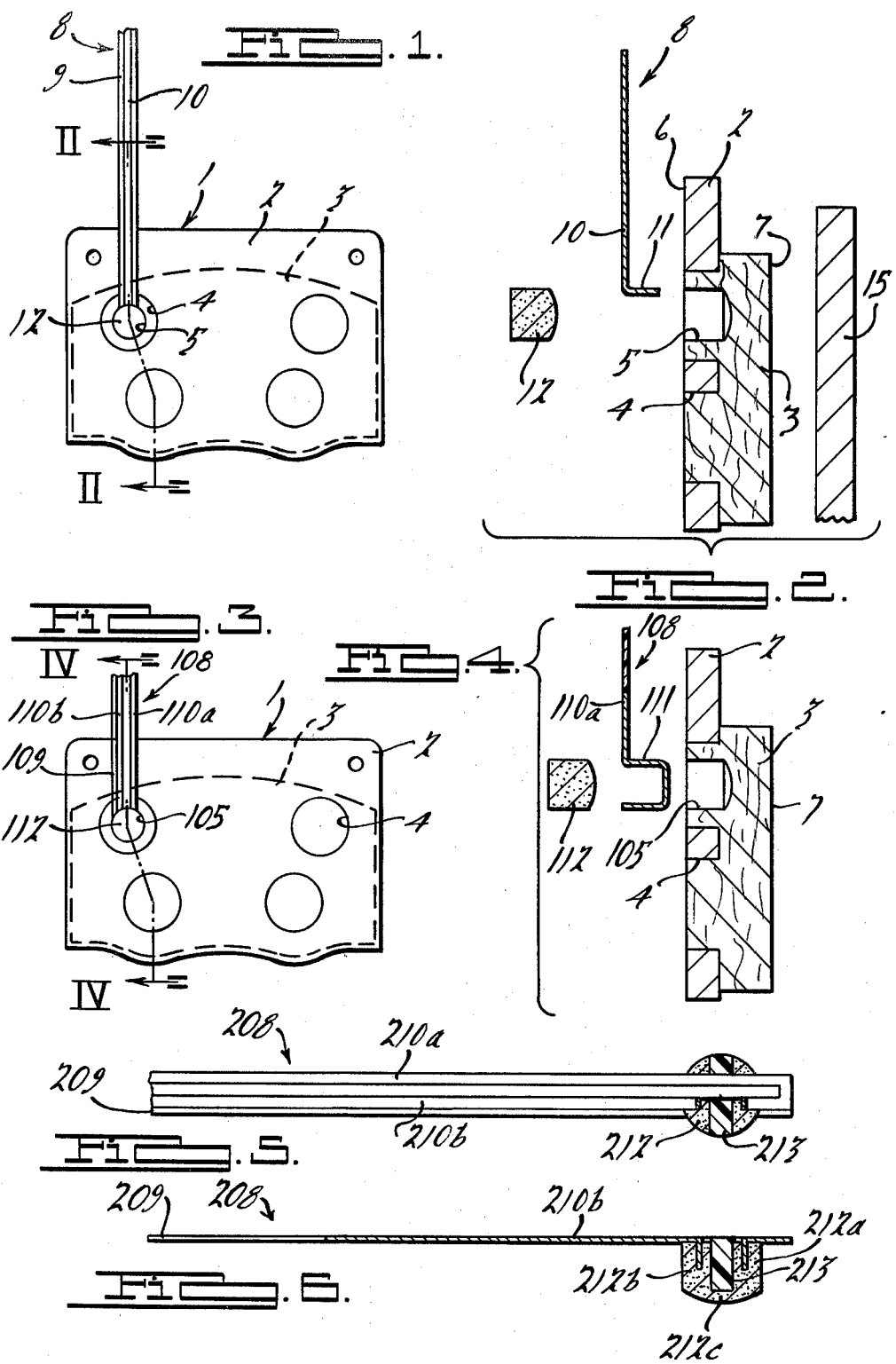

BRAKE PAD WITH ELECTRICAL CONTACTS FOR BRAKE WARNING SYSTEMS

This application is a continuation, of application Ser. No. 204,665, filed Nov. 6, 1980, now abandoned.

DESCRIPTION

This invention relates to brake pads.

Conventional brake pads comprise a layer of friction material having a working face which forms a front face of the pad and which, in use, engages a braking surface such as a brake disc or a brake drum. In order to provide a warning signal when the layer of friction material is about to wear out, it is known to incorporate an electrical lead in the pad. This lead terminates in a contact which is so positioned relative to the layer of friction material that, in use, it will contact the braking surface when the layer of friction material has become abraded by a predetermined amount. Such a contact can be used to generate a warning signal. Our British patent application No. 7,903,576 discloses a brake pad of this type.

Hitherto, the electrical leads have been formed from insulated wire. The use of insulated wire requires relatively robust mountings in order to connect the wire securely to the brake pad. As a result, the cost of the brake pad is increased and its assembly is made more difficult.

According to the present invention there is provided a brake pad comprising a layer of friction material having a working face which forms a front face of the pad and which, in use, engages a braking surface, and an electrical lead terminating in a contact, the contact being so positioned relative to the layer of friction material that, in use, it will contact the braking surface when the layer of friction material has become abraded by a predetermined amount, characterised in that the electrical lead comprises a flexible strip of insulating material having deposited thereon at least one flexible strip of electrically conductive material.

By forming the lead from a flexible conductive strip deposited on a flexible insulating strip, for example from flexible printed circuit material, the weight of the lead is substantially reduced, and much less robust mountings are required in order to attach the lead to the brake pad. The cost of the brake pad can therefore be reduced, and its reliability increased.

In one embodiment of the invention, the contact is formed directly by the flexible strip of electrically conductive material at one end of the lead, thereby reducing the cost of the brake pad even further. Alternatively the contact may be formed by a body of solid electrically conductive material, e.g. graphite, connected to the end of the lead, for example by moulding the lead into the body. In either case, the contact is conveniently connected to the brake pad by mounting the contact in a recess which extends from a rear face of the pad into the layer of friction material. With this arrangement the lead will extend from the rear of the brake pad and will therefore be conveniently positioned for connection into an electrical circuit. British patent application No. 7,903,576 discloses a particularly useful method of connecting the lead to the brake pad.

The lead may comprise a single strip of conductive material but preferably comprises two parallel strips of electrically conductive material which are in electrical communication with each other at the contact, for example through a body of solid conductive material forming the contact (as disclosed in British patent application No. 7,903,576) or through a connecting strip of conductive material deposited on the strip of insulating material. The use of a lead with two such strips of conductive material has the advantage that, in a motor vehicle, the leads can be connected together in series to permit testing of the warning system.

Several particular embodiments of the invention will now be described, by way of example only, with reference to the accompanying schematic drawings, in which:

FIG. 1 is a rear view of a brake pad in accordance with the invention;

FIG. 2 is an "exploded" cross-sectional view of the brake pad of FIG. 1;

FIGS. 3 and 4 are views similar to FIGS. 1 and 2 respectively, showing a fuller alternate brake pad in accordance with the invention;

FIG. 5 shows, in plan and on an enlarged scale, an alternative construction of lead for use in a brake pad of the invention;

FIG. 6 is a side view, in cross-section of the lead of FIG. 5.

Referring to FIGS. 1 and 2, a brake pad 1 comprises a metal back plate 2 carrying a layer of friction material 3 which is keyed into a series of apertures 4 in the back plate 1.

A recess 5 formed in the friction material filling one of the apertures 4 extends from the rear face 6 of the pad to a distance from the front face 7 of the pad which is marginally less than the maximum amount of wear which the friction material can undergo during its working life. The interior surface of the recess 5 is coated with an insulating material (e.g. an epxoy resin).

A lead 8 connected to the pad 1 comprises a strip 9 of flexible printed circuit material of conventional construction, comprising a base layer of flexible plastics material (e.g. polyethylene) having deposited thereon a flexible layer 10 of electrically conductive material (e.g. copper). A top layer of flexible plastics material is deposited over the base layer and the layer of electrically conductive material so that the latter is electrically insulated. The top layer is removed at one end portion 11 of the strip 8 to expose the conductive material 10. This end portion 11 is bent over and is received in the recess 5 with the conductive material facing inwardly. The end portion 11 is then retained in the recess 5 by means of a body 12 of electrically conductive material, e.g. graphite, which connects electrically with the conductive material on the end portion 11 of the strip 8, thereby forming a contact for the lead 9. The body 12 is a friction fit in the recess and is additionally secured therein by an adhesive, e.g. an epoxy resin.

The other end of the lead 8 may be provided with an electrical connector (not shown) for coupling the lead into an electrical circuit on a vehicle. In use, the front face 7 of the layer of friction material 3 eventually becomes abraded to such an extent that the body 12 of conductive material will contact the braking surface 15 when the brakes are applied, thereby connecting the lead 8 to earth and generating a warning signal on an instrument panel in conventional manner.

In an alternative construction (not shown) the body 12 could be composed of insulating material so that the layer of conductive material in the end portion of the strip 9 acts as the contact for the lead 8.

Referring now to FIGS. 3 and 4, an alternative construction is illustrated in which the lead 9 is formed of similar printed circuit material to that described above with reference to FIGS. 1 and 2 except that it includes two parallel strips 110a, and 110b of conductive material which are electrically connected to each other in the end portion 111 of the strip by a transversely extending strip of conductive material.

As best seen in FIG. 4, the end portion 111 of the strip 109 is bent to conform to the internal surface of the recess 105 and is retained therein by a body 112 of insulating material in a manner similar to that described with reference to FIG. 1 or 2. The conductive material at the end portion of the strip 109 therefore acts as a contact for the lead 108.

The use of a loop of wire in the lead 109 has the advantage that the lead 109 can be connected in series with similar leads in other brake pads in a vehicle so that the integrity of the brake warning circuit can be tested. A warning signal will be generated when the circuit is broken either as a result of abrasion of the contact of the lead by the braking circuit, or as a result of physical damage to the system.

FIGS. 5 and 6 illustrate a still further alternative construction for the lead 208. In this construction the contact for the lead 208 is formed by a body of electrically conductive material 212, e.g. graphite which is bifurcated, to form two legs 212a and 212b which are separated from each other by a sheet of insulating material 213, e.g. a ceramic chip.

The strip 209 is similar in construction to that described with reference to FIGS. 3 and 4, except that one of the strips 210b of conductive material is severed. The insulating material is removed from the severed ends of the severed strip 210b and the ends are bent downwardly, as seen in FIG. 6 into a respective one of the legs 212a and 212b of the body 212 to make electrical contact therewith. The crown 212c of the body 212 effects electrical communication between the two legs 212a and 212b. Thus, since the lead includes a loop of conductive material, it is capable of being tested for circuit integrity in the manner described with reference to the brake pad of FIGS. 3 and 4. In addition, as the layer of friction material wears, the crown 212c will eventually make contact with the braking surface 15a, thereby earthing the electrical circuit when the brakes are applied. This resulting change in electrical potential in the circuit can be used to generate a first warning signal indicating that the brake pad is approaching the end of its life. The resulting change in electrical potential will occur only when the crown 212c is in contact with the braking surface 15a.

Further abrasion of the pad will eventually wear away the crown 212c completely, thus producing a permanent break in the circuit since chip 213 is non-conductive, and indicating that the brake pad is worn dangerously low. The resulting change in electrical potential thus wil become permanent, independent of whether the brake pad is in contact with the braking surface 15a or not. Thus, this second signal is different from the first signal in that the first signal has the charge in potential occurring only when the brake pad is in contact with the braking surface 15a. This difference in signal gives a further warning indicating further abrasion.

Variations and modifications of the present invention are possible without departing from its scope and spirit as defined by the appended claims.

We claim:

1. A brake pad comprising:
   a layer of friction material having a front face operably engagable to a braking surface, and an electrical lead terminating in a contact, the contact being held in position within a recess in the layer of friction material below said front face by a body forming a friction fit within said recess, such that upon a predetermined amount of abrading of the layer of friction material, the contact becomes exposed and abuts the braking surface when the brake is operated, the electrical lead including a flexible strip of insulating material having deposited thereon at least one flexible strip of electrically conductive material which is in electrical contact with said contact within said layer below said front face.

2. A brake pad according to claim 1 wherein the contact is formed by the flexible strip of electrically conductive material at one end of the lead.

3. A brake pad according to claim 1 wherein the contact is formed by a body of solid electrically conductive material connected to the end of the lead.

4. A brake pad according to claim 2 or claim 3 wherein the contact is received in a recess which extends from a rear face of the pad into the layer of friction material.

5. A brake pad according to claim 4 wherein the electrical lead comprises a flexible strip of insulating material having deposited thereon two parallel flexible strips of electrically conductive material which are in electrical communication with each other at the contact.

6. A brake pad according to claim 1, 2 or 3 wherein the electrical lead comprises a flexible strip of insulating material having deposited thereon two parallel flexible strips of electrically conductive material which are in electrical communication with each other at the contact.

7. A brake pad according to claim 1, 2 or 3 wherein the electrical lead is composed of printed circuit material.

8. A brake pad according to claim 4 wherein the electrical lead is composed of printed circuit material.

9. A brake pad according to claim 6 wherein the electrical lead is composed of printed circuit material.

10. A brake pad comprising:
    a layer of friction material having a front face operably engagable to a braking surface and an electrical lead held in position below said front face within a recess in said layer of friction material by a body of electrically conductive material forming a friction fit within said recess, the conductive material of said body being substantially bifurcated into two sides by a central section of insulating material, said two sides being in electrical contact with one another solely through a crown of conductive material bridging said insulating central section, said body being inserted into said recess crown-first toward said front face of said brake pad, said electrical lead including a flexible strip of insulating material having deposited thereon two flexible strips of electrically conductive material, each of said two strips being in electrical contact with a different one of said two sides of electrically conductive material of said body, forming a circuit through said crown.

* * * * *